(12) United States Patent
Ricketts

(10) Patent No.: US 9,373,987 B2
(45) Date of Patent: Jun. 21, 2016

(54) INTEGRATED FLYWHEELS, SYSTEMS AND METHODS FOR ELECTRIC GENERATION AND BRAKING OF A GENERAL PURPOSE ENGINE

(71) Applicant: Honda Motor Co., Ltd., Tokyo (JP)

(72) Inventor: Tyler Isaac Ricketts, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 328 days.

(21) Appl. No.: 14/024,285

(22) Filed: Sep. 11, 2013

(65) Prior Publication Data
US 2015/0069868 A1    Mar. 12, 2015

(51) Int. Cl.
| | |
|---|---|
| *H02K 7/10* | (2006.01) |
| *H02K 7/102* | (2006.01) |
| *B60K 6/10* | (2006.01) |
| *B60K 7/00* | (2006.01) |
| *H02K 21/22* | (2006.01) |
| *H02K 7/02* | (2006.01) |
| *F16D 49/16* | (2006.01) |
| *F16D 49/00* | (2006.01) |

(52) U.S. Cl.
CPC ............. *H02K 7/102* (2013.01); *B60K 6/105* (2013.01); *B60K 7/0007* (2013.01); *H02K 7/02* (2013.01); *H02K 21/222* (2013.01); *F16D 49/00* (2013.01); *F16D 49/16* (2013.01); *Y02T 10/6204* (2013.01)

(58) Field of Classification Search
CPC ..... H02K 7/102; H02K 7/1023; B60K 7/0007
USPC .......................................... 310/74, 77; 188/75
See application file for complete search history.

(56) References Cited

U.S. PATENT DOCUMENTS

| | | |
|---|---|---|
| 3,243,021 A | 3/1966 | Pelensky |
| 3,570,226 A | 3/1971 | Haverkamp et al. |
| 3,731,472 A | 5/1973 | Kamlukin |
| 4,048,788 A | 9/1977 | Kamlukin et al. |

(Continued)

FOREIGN PATENT DOCUMENTS

| | | |
|---|---|---|
| CN | 102795102 | 11/2012 |
| EP | 0521840 | 6/1992 |

(Continued)

OTHER PUBLICATIONS

Extended European Search Report for Application No. 14 182 607 dated Dec. 4, 2014.

(Continued)

*Primary Examiner* — Hanh Nguyen
(74) *Attorney, Agent, or Firm* — Jenkins, Wilson, Taylor & Hunt, P.A.

(57) ABSTRACT

Systems, devices, and methods for using an engine flywheel can provide both electric power output and braking of powered equipment. In particular, an engine flywheel can include a first rotor element configured to be coupled to a drive shaft for rotation with the drive shaft, one or more magnets carried by the first rotor element, the one or more magnets being configured for positioning with respect to a stator to generate electrical current upon rotation of the first rotor element, and a second rotor element configured to be coupled to the drive shaft for rotation with the drive shaft, the second rotor element including a braking surface configured for engagement with a braking element to slow the rotation of the second rotor element.

18 Claims, 2 Drawing Sheets

(56) References Cited

U.S. PATENT DOCUMENTS

| | | | |
|---|---|---|---|
| 4,226,313 A | 10/1980 | Meldahl et al. | |
| 4,313,293 A | 2/1982 | Nagai | |
| 5,267,925 A | 12/1993 | Boyd | |
| 5,293,731 A | 3/1994 | Thomas et al. | |
| 5,407,400 A | 4/1995 | Thomas et al. | |
| 5,751,124 A | 5/1998 | Josephs | |
| 5,982,063 A * | 11/1999 | Lutz et al. | 310/77 |
| 6,005,358 A | 12/1999 | Radev | |
| 6,084,325 A * | 7/2000 | Hsu | 310/74 |
| 6,095,294 A | 8/2000 | McGourthy | |
| 6,581,731 B2 * | 6/2003 | Chen | 188/164 |
| 7,311,184 B2 | 12/2007 | Patridge | |
| 7,552,787 B1 | 6/2009 | Williams | |
| 8,240,414 B2 | 8/2012 | Sasahara et al. | |
| 8,957,641 B1 * | 2/2015 | Hsu | 322/4 |
| 2012/0217758 A1 * | 8/2012 | Chen | 290/1 C |

FOREIGN PATENT DOCUMENTS

| | | |
|---|---|---|
| EP | 2848835 A1 | 3/2015 |
| FR | 2630868 | 4/1988 |
| JP | 3 002 619 U | 9/1994 |
| JP | H08-154 370 A | 6/1996 |
| JP | H11-130 365 A | 5/1999 |
| WO | WO 9748176 | 12/1997 |
| WO | WO-2009/010819 A1 | 1/2009 |
| WO | WO-2013/025096 A1 | 2/2013 |

OTHER PUBLICATIONS

European intent to Grant for Application No. 14 182 607.3 dated Dec. 23, 2015.

Japanese Office Action for Application No. 2014-183973 dated Feb. 2, 2016.

* cited by examiner

INTEGRATED FLYWHEELS, SYSTEMS AND METHODS FOR ELECTRIC GENERATION AND BRAKING OF A GENERAL PURPOSE ENGINE

TECHNICAL FIELD

The subject matter disclosed herein relates generally to the design and operation of combustion engines for powered equipment. More particularly, the subject matter disclosed herein relates to the design and operation of an engine flywheel of a combustion engine.

BACKGROUND

Many combustion engines for small powered equipment include an engine flywheel to moderate speed fluctuations in the engine. Specifically, the flywheel can be designed to be able to develop an inertia large enough such that quick spurts by the engine or sudden loads (e.g., a lawnmower hitting a clump of weeds) are evened out. Because of this large inertia, however, it can be difficult to quickly slow and/or stop the operation of the engine because of the time needed to dissipate the energy stored in the flywheel. To speed this slow-down, in particular to meet regulations regarding maximum stopping times (e.g., blade stop time for a lawnmower), a brake can be configured to act directly on the engine flywheel to actively dissipate the stored energy. In such systems, the energy of the spinning flywheel is generally lost (e.g., dissipated as heat) upon braking.

In some contrasting configurations, such as portable generators and alternators for some small motor vehicle engines (e.g., motorcycles, scooters), similarly-structured combustion engines can provide high power generation from the rotation of a rotor/flywheel by converting the mechanical energy of the flywheel into electrical energy. Further, because these engine-generators generally don't have any need to stop quickly, these systems generally don't rely on a brake mechanism to slow the operation of the engine, and thus much of the energy stored in the flywheel can be effectively recaptured as electrical power over time.

Although the powered equipment and dedicated engine-generators are designed to serve much different purposes, it would be desirable for advantageous aspects of both types of systems to be integrated together. For example, in a lawn-mower, instead of dissipating all of the energy stored in the flywheel during braking, it would be advantageous to recapture at least some of that stored energy and convert it to electricity in a manner similar to an engine-generator. It is undesirable, however, to apply a brake to the component to which magnets are mounted for power generation because the braking can cause heat to build up, the component to deflect, and any adhesives to be stressed. These factors can diminish the ability of the electrical generation components of the system to operate as intended, and such factors can further cause the electrical generation system to fail prematurely.

As a result, it would be desirable for an engine flywheel to be able to integrate electric power generation with rapid engine braking without each of the two operations impeding the operation of the other.

SUMMARY

In accordance with this disclosure, systems and methods for using an engine flywheel both for electric power output and for braking of powered equipment are provided. In one aspect, an engine flywheel is provided. The engine flywheel can include a first rotor element configured to be coupled to a drive shaft for rotation with the drive shaft, one or more magnets carried by the first rotor element, the one or more magnets being configured for positioning with respect to a stator to generate electrical current upon rotation of the first rotor element, and a second rotor element configured to be coupled to the drive shaft for rotation with the drive shaft, the second rotor element comprising a braking surface configured for engagement with a braking element to slow the rotation of the second rotor element.

In another aspect, a combined electric generation and engine braking system can include a drive shaft rotatable about a center axis, a first rotor element coupled to the drive shaft for rotation with the drive shaft, one or more magnets carried by the first rotor element, a stator positioned at or near the first rotor element and configured to generate electrical current upon rotation of the first rotor element, a second rotor element coupled to the drive shaft for rotation with the drive shaft, the second rotor element comprising a braking surface, and a braking element positioned at or near the second rotor element and configured to selectively engage the braking surface of the second rotor element to slow the rotation of the second rotor element.

In yet another aspect, a method for electric generation and engine braking is provided. The method can include rotating a flywheel assembly about a center axis of a drive shaft connected to the flywheel assembly, the flywheel assembly comprising a first rotor element coupled to the drive shaft, one or more magnets carried by the first rotor element, and a second rotor element comprising a braking surface. For example, rotating the flywheel assembly about the center axis of the drive shaft can involve rotating the one or more magnets past a stator positioned at or near the first rotor element to generate electrical current. The method can further include a step of selectively engaging a braking element with the braking surface of the second rotor element to slow the rotation of the flywheel assembly.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The present subject matter provides systems, devices, and methods for using an engine flywheel both for electric power output and for braking of powered equipment. In one aspect, the present subject matter provides an engine flywheel that does not suffer from the drawbacks discussed above that can be associated with combining electrical generation and braking into a single component.

Figure 1:
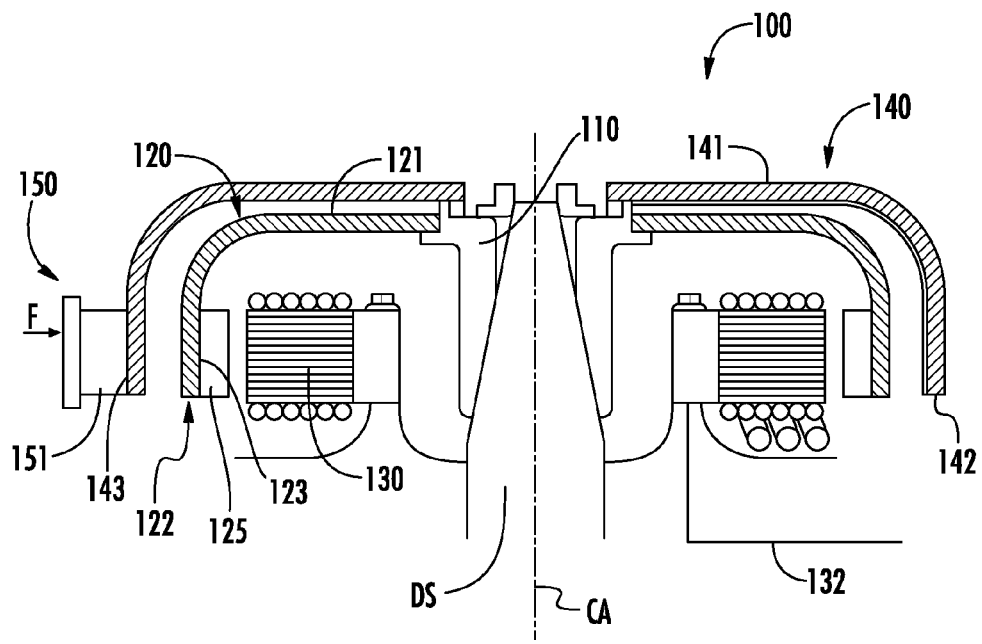
FIG. 1 of the drawings is a side cutaway view of an engine flywheel according to an embodiment of the presently disclosed subject matter.

Specifically, referring to FIG. 1, an engine flywheel, generally designated 100, is provided. Engine flywheel 100 can include a first rotor element 120 and a second rotor element 140 that are each configured to be coupled to drive shaft DS for rotation therewith. Specifically, for example, first rotor element 120 can include a first disc portion 121 having a first diameter D1 and configured for positioning about drive shaft DS. First disc portion 121 can be coupled to a hub portion 110 that can be itself coupled to drive shaft DS such that rotation of drive shaft DS causes corresponding rotation of hub portion 110 and first rotor element 120. First rotor element 120 can further include a first ring portion 122 extending from an outer edge of first disc portion 121. As shown in FIG. 1, for example, first disc portion 121 can extend in a direction at least substantially perpendicular to a center axis CA of drive shaft DS, and first ring portion 122 can extend from the outer edge of first disc portion 121 in a direction substantially perpendicular to first disc portion 121. In this arrangement, first ring portion 122 can form a first annular mass that is rotatable with drive shaft DS about center axis CA of drive shaft DS.

Similarly, second rotor element 140 can include a second disc portion 141 configured for positioning about drive shaft DS (e.g., coupled to drive shaft DS by way of hub portion 110) and a second ring portion 142 extending from an outer edge of second disc portion 141. As shown in FIG. 1, second disc portion 141 can have a second diameter D2 and can extend in a direction substantially perpendicular from center axis CA of drive shaft DS (e.g., substantially parallel with but spaced apart from first disc portion 121), and second ring portion 142 can extend from the outer edge of second disc portion 141 in a direction substantially perpendicular to second disc portion 141 (e.g., substantially concentric with first ring portion 122). In this arrangement, second ring portion 142 can form a second substantially annular mass that is rotatable with drive shaft DS about center axis CA of drive shaft DS. As shown in FIG. 1, second disc portion 141 can extend a distance from center axis CA of drive shaft DS that is greater than a distance to which first disc portion 121 extends. In other words, second diameter D2 can be greater than first diameter D1. In this way, second ring portion 142 can substantially surround first ring portion 122 concentrically, thereby allowing first rotor element 120 to at least partially "nest" within second rotor element 140. This nested arrangement can minimize the space within the equipment that is taken up by engine flywheel 100.

Figure 2A:
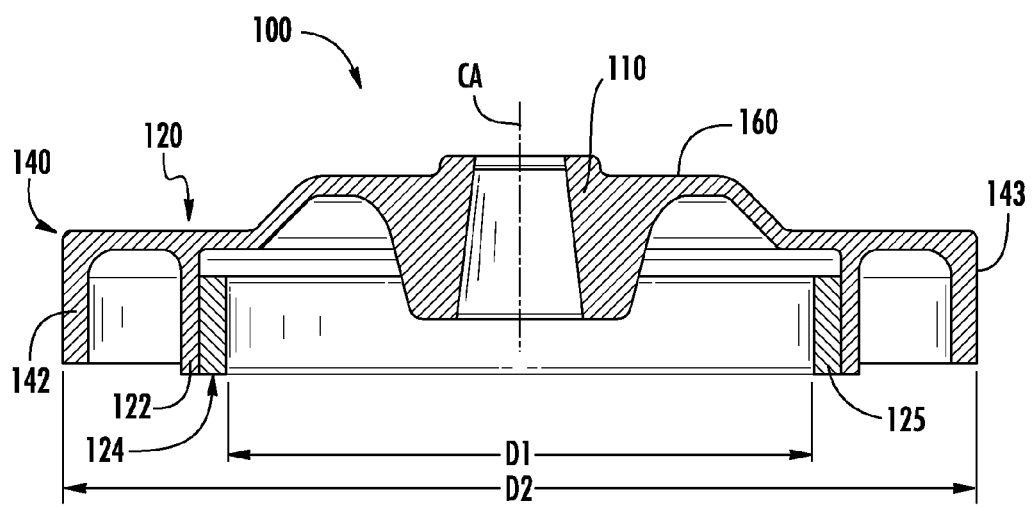
FIG. 2A of the drawings is a side cutaway view of an engine flywheel according to another embodiment of the presently disclosed subject matter.
Figure 2B:
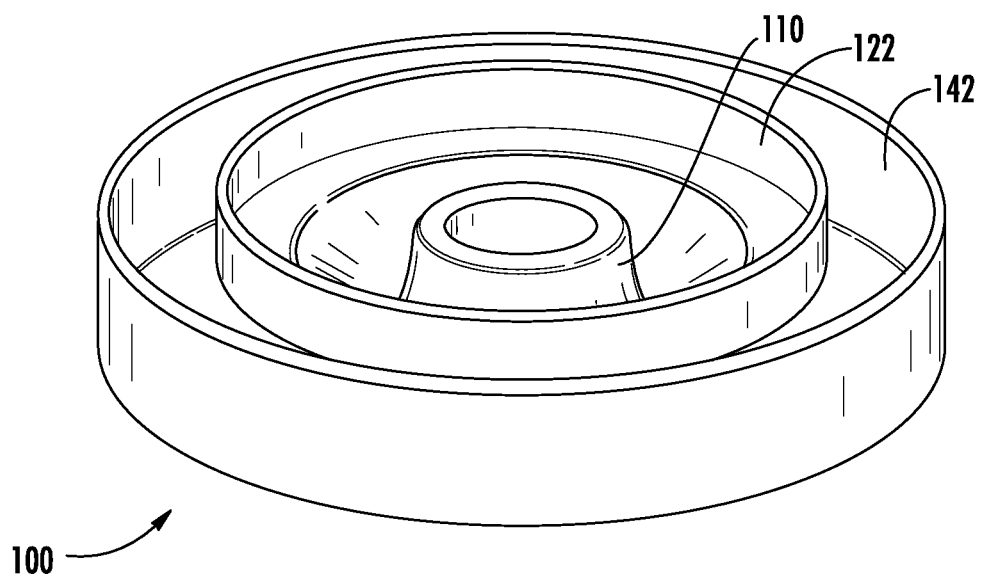
FIG. 2B of the drawings is a bottom perspective view of the engine flywheel shown in FIG. 2A.

Alternatively, as shown in FIGS. 2A and 2B, first rotor element 120 and second rotor element 140 can be elements of a single integrated flywheel design. Specifically, as shown in FIG. 2A, rather than independent ring portions connecting each element to drive shaft DS (e.g., first disc portion 121 and second disc portion 141 being connected to hub portion 110), each of first rotor element 120 and second rotor element 140 can extend from a single, unitary disc portion 160 that is coupled to drive shaft DS, such as by a connection to intervening hub portion 110. In this regard, first ring portion 122 can extend from unitary disc portion 160 at a distance that is less than a full radius of unitary disc portion 160. In other words, first diameter D1 of first ring portion 122 can be selected such that unitary disc portion 160 extends beyond a distance at which first ring portion 122 protrudes. Further, second ring portion 142 can extend from unitary disc portion 160 at a distance that is greater than the distance at which first ring portion 122 protrudes (i.e., second diameter D2 can be greater than first diameter D1). In the exemplary configuration shown in FIG. 2A, for example, second ring portion 142 can extend from an outer edge of unitary disc portion 160, whereas first ring portion 122 can extend from a face of unitary disc portion 160 between its center and its outer edge. In this configuration, similarly to the configuration shown in FIG. 1 and described above, second ring portion 142 can substantially surround first ring portion 122 concentrically, thereby allowing first rotor element 120 to at least partially "nest" within second rotor element 140.

In any configuration, the division of engine flywheel 100 into multiple rotor elements (e.g., first rotor element 120 and second rotor element 140) can allow the different elements to serve different functions. Specifically, for example, first rotor element 120 can be configured to be a component of an electrical generation system. In this regard, first rotor element 120 can include a mounting surface 123 to which one or more magnets 125 can be attached. For example, as shown in FIG. 2A, mounting surface 123 can be provided on an inward-facing surface of first ring portion 122 (i.e., on a surface of first ring portion 122 that faces towards center axis CA of drive shaft DS), although those having skill in the art will recognize that the one or more magnets 125 can be mounted to any of a variety of surfaces of first rotor element 120 as part of an electrical generation system. A magnet retainer 124 can be provided on mounting surface 123, and one or more magnets 125 can be carried by magnet retainer 124. The one or more magnets 125 can be configured to induce an electric current to flow in a stator assembly 130 upon movement of the one or more magnets 125. In particular, when engine flywheel 100 is installed onto drive shaft DS, stator assembly 130 can be provided in a substantially fixed position with respect to first rotor element 130 (i.e., stator assembly 130 does not rotate with drive shaft DS) at or near first ring portion 122 such that, upon rotation of engine flywheel 100, the one or more magnets 125 are rotated past stator assembly 130. The current induced in the stator assembly 130 can be routed, such as through one or more wires 132, to deliver power to any electrically-driven components of the powered equipment (e.g., wheel drive system, electronic controls).

In contrast, second rotor element 140 can be configured to be a component in an engine braking system. In this regard, second rotor element 140 can include a braking surface 143 configured for engagement with a braking element 150 to slow the rotation of second rotor element 140 (and thereby to correspondingly slow the rotation of engine flywheel 100). For example, as shown in FIGS. 1 and 2A, braking surface 143 can be provided on an outward-facing surface of second ring portion 142 (i.e., on a surface of second ring portion 142 that faces away from center axis CA of drive shaft DS), although braking surface 143 can be provided on any of a variety of surfaces of first rotor element 120 depending on the particular positioning and configuration of braking element 150. Regardless of the particular configuration of second rotor element 140 and braking element 150, braking of flywheel can be effected by selectively engaging braking element 150 with braking surface 143. Specifically, as shown in FIG. 1 for example, braking element 150 can include a brake pad 151 that is selectively movable into and out of engagement with braking surface 143.

Those having skill in the art should recognize that isolating the electrical generation function and the braking function to the first rotor element 120 and the second rotor element 140, respectively, can be helpful to avert the problems that can result from both functions being applied to the same component. Specifically, because braking surface 143 can be positioned away from mounting surface 123 to which the one or more magnets 125 can be coupled, it can be less likely that braking will cause heat to build up at mounting surface 123 since first ring portion 122 can be separated from second ring portion 142 by an air gap. In addition, first ring portion 122 can be shielded from any deflection caused by engagement of braking element 150, and it will thereby be less likely that any stresses be developed on the adhesives used to mount the one or more magnets 125 to mounting surface 123. As a result, it is believed that the systems, devices, and methods described herein can be effectively used both for electric power output and for braking of powered equipment.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. An engine flywheel comprising:
    a first rotor element configured to be coupled to a drive shaft for rotation with the drive shaft;
    one or more magnets carried by the first rotor element, the one or more magnets being configured for positioning with respect to a stator to generate electrical current upon rotation of the first rotor element;
    a second rotor element configured to be coupled to the drive shaft for rotation with the drive shaft, the second rotor element comprising a braking surface configured for engagement with a braking element to slow rotation of the second rotor element; and
    a hub portion coupled to the drive shaft for rotation with the drive shaft, wherein the first rotor element and the second rotor element are connected to the hub portion.

2. The engine flywheel of claim 1, wherein the first rotor element and the second rotor element are integrally formed in a unitary component.

3. The engine flywheel of claim 1, wherein the first rotor element comprises a first disc portion configured for positioning about the drive shaft and a first ring portion extending from an outer edge of the first disc portion;
    wherein the one or more magnets are secured to a surface of the first ring portion.

4. The engine flywheel of claim 3, wherein the second rotor element comprises a second disc portion configured for positioning about the drive shaft and a second ring portion extending from an outer edge of the second disc portion;
    wherein the braking surface comprises a surface of the second ring portion.

5. The engine flywheel of claim 4, wherein the outer edge of the first disc portion defines a first diameter and the outer edge of the second disc portion defines a second diameter, the first diameter being smaller than the second diameter.

6. The engine flywheel of claim 4, wherein the first ring portion is positioned between the second ring portion and an axis of rotation that is substantially orthogonal to one or both of the first disc portion or the second disc portion.

7. The engine flywheel of claim 1, wherein the braking element comprises a brake pad movable into and out of engagement with the braking surface.

8. The engine flywheel of claim 1, wherein the first rotor element is connected to the hub portion by a first disc portion; and
    wherein the second rotor element is connected to the hub portion by a second disc portion that is spaced apart from the first disc portion.

9. The engine flywheel of claim 1, wherein the first rotor element and the second rotor element are both connected to the hub portion by a unitary disc portion.

10. A combined electric generation and engine braking system, comprising:
    a drive shaft rotatable about a center axis;
    a first rotor element coupled to the drive shaft for rotation with the drive shaft;
    one or more magnets carried by the first rotor element;
    a stator positioned at or near the first rotor element and configured to generate electrical current upon rotation of the first rotor element;
    a second rotor element coupled to the drive shaft for rotation with the drive shaft, the second rotor element comprising a braking surface;
    a braking element positioned at or near the second rotor element and configured to selectively engage the braking surface of the second rotor element to slow rotation of the second rotor element; and
    a hub portion coupled to the drive shaft for rotation with the drive shaft, wherein the first rotor element and the second rotor element are connected to the hub portion.

11. The system of claim 10, wherein the first rotor element and the second rotor element are integrally formed.

12. The system of claim 10, wherein the first rotor element comprises a first disc portion positioned about the drive shaft and a first ring portion extending from an outer edge of the first disc portion;
    wherein the one or more magnets are secured to a surface of the first ring portion.

13. The system of claim 12, wherein the second rotor element comprises a second disc portion positioned about the drive shaft and a second ring portion extending from an outer edge of the second disc portion;
    wherein the braking surface comprises a surface of the second ring portion.

14. The system of claim 13, wherein the outer edge of the first disc portion defines a first diameter and the outer edge of the second disc portion defines a second diameter, the first diameter being smaller than the second diameter.

15. The system of claim 13, wherein the first ring portion is positioned between the second ring portion and the center axis.

16. The system of claim 10, wherein the braking element comprises a brake pad movable into and out of engagement with the braking surface.

17. A method for electric generation and engine braking, the method comprising:
    rotating a flywheel assembly about a center axis of a drive shaft connected to the flywheel assembly, the flywheel assembly comprising:
        a first rotor element coupled to the drive shaft;
        one or more magnets carried by the first rotor element;
        a second rotor element comprising a braking surface; and
        a hub portion coupled to the drive shaft for rotation with the drive shaft, wherein the first rotor element and the second rotor element are connected to the hub portion
        wherein rotating the flywheel assembly about the center axis of the drive shaft comprises rotating the one or more magnets past a stator positioned at or near the first rotor element to generate electrical current; and
    selectively engaging a braking element with the braking surface of the second rotor element to slow rotation of the flywheel assembly.

18. The method of claim 17, wherein selectively engaging a braking element with the braking surface comprises selectively moving a brake pad into and out of engagement with the braking surface.

* * * * *